United States Patent
Albrecht et al.

(10) Patent No.: US 6,211,590 B1
(45) Date of Patent: Apr. 3, 2001

(54) SPRING-APPLIED PAD AND CARRIER BRAKE

(75) Inventors: James W. Albrecht, Dayton, OH (US); Ming Liang Fe, Ithaca, NY (US)

(73) Assignees: Stromag, Inc., Dayton, OH (US); Raymond Corporation, Greene, NY (US)

( * ) Notice: Subject to any disclaimer, the term of this patent is extended or adjusted under 35 U.S.C. 154(b) by 0 days.

(21) Appl. No.: 09/164,818

(22) Filed: Oct. 1, 1998

Related U.S. Application Data

(60) Provisional application No. 60/060,768, filed on Oct. 2, 1997.

(51) Int. Cl.[7] .................................................. H02K 7/10
(52) U.S. Cl. .............................. 310/77; 310/93; 310/103; 188/158
(58) Field of Search .................................. 310/77, 76, 93, 310/103; 188/158, 161, 163, 164; 192/84.21, 84.5

(56) References Cited

U.S. PATENT DOCUMENTS

| | | | |
|---|---|---|---|
| 3,608,679 | * | 9/1971 | Harrison ................. 188/171 |
| 3,624,767 | * | 11/1971 | Kroeger ................. 192/18 B |
| 3,750,781 | * | 8/1973 | Lengsfeld ................. 192/18 B |
| 4,430,592 | * | 2/1984 | Manktelow ................. 310/93 |
| 4,498,066 | * | 2/1985 | Fujiwara et al. ................. 335/281 |
| 4,703,841 | * | 11/1987 | Lengsfeld et al. ................. 192/12 BA |
| 5,057,728 | | 10/1991 | Dammeyer et al. ................. 310/77 |
| 5,509,509 | * | 4/1996 | Dammeyer et al. ................. 188/164 |
| 5,631,510 | * | 5/1997 | Flaig et al. ................. 310/77 |
| 5,699,883 | * | 12/1997 | Albrecht ................. 188/171 |

* cited by examiner

*Primary Examiner*—Nestor Ramirez
*Assistant Examiner*—Joseph Waks
(74) *Attorney, Agent, or Firm*—Felsman, Bradley, Vaden, Gunter & Dillon, L.L.P.; James E. Bradley

(57) ABSTRACT

A braking system has a shaft which rotates with a wheel on a vehicle. A rotor rotates with the shaft within a housing. The housing also contains an electromagnetic coil and two armatures. The rearward armature is in contact with the coil while the forward armature is adjacent to the rotor. The rearward armature does not touch the rotor and is more strongly attracted to the coil than the forward armature. Each armature has springs which independently urge it toward the rotor. An electric circuit causes the current supplied to the coil to gradually decay rather than abruptly stop. When the vehicle is parked and subjected to static braking, the coil is de-energized so that the armatures are forced toward the rotor by their springs. In this state, the rearward armature applies force to the forward armature to increase the pressure against the rotor. When the system is disengaged, the coil is energized to attract the armatures and allow the rotor to freely rotate. Finally, the moving vehicle may be slowed or stopped with dynamic braking which de-energizes the coil. In this state, the forward armature quickly overcomes the coil so that it engages the rotor before the rearward armature applies additional force. An increased level of braking force is applied to the rotor when the rearward armature is released. Thus, a graduated dynamic braking force is applied to the rotor when the coil is de-energized.

25 Claims, 1 Drawing Sheet

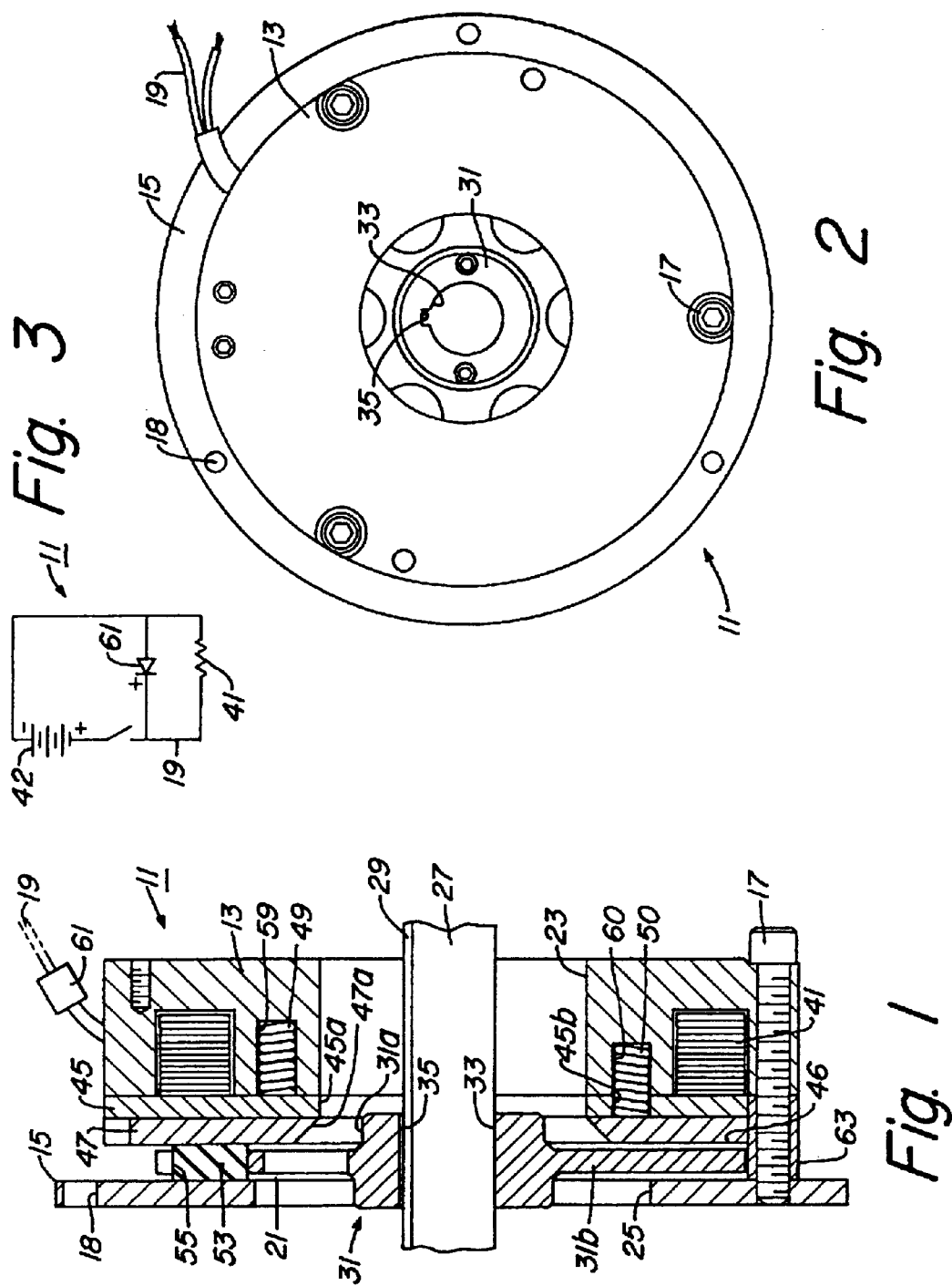

SPRING-APPLIED PAD AND CARRIER BRAKE

This Application claims benefit of Provisional Application 60/060,768 filed Oct. 2, 1997.

TECHNICAL FIELD

This invention relates in general to braking systems for electric powered vehicles, and in particular to a electric braking assembly which applies a graduated dynamic braking force.

BACKGROUND OF THE INVENTION

In materials handling vehicles such as fork lift trucks, it is desirable to vary the amount of braking force applied so that the vehicle may be gradually slowed and yet have a high static torque for parking the vehicle on inclines. Hydraulic brakes provide for great flexibility in the amount of braking force applied, but hydraulic brake systems are expensive because of the required space for hardware and plumbing. Electric brakes are frequently used in materials handling vehicles, particularly electrically powered vehicles, because of their size and simplicity. However, electric brakes normally do not lend themselves to being variable in the braking force applied, and they require separate parking and dynamic braking assemblies.

In another application, workers are routinely elevated above the body of the vehicle in a carriage. When a worker is in this position and the vehicle is in motion, it is also desirable to apply braking force gradually to minimize the amount of vibration experienced by the worker who is elevated in the carriage. Here again electric brakes are frequently used, but they can be marginally effective in these gradual braking force applications. An electric braking system which varies its braking force to gradually stop a vehicle without sliding the wheels and yet provide high static torque for parking the vehicle on inclines and the like is needed.

SUMMARY OF THE INVENTION

A graduated, two-step electric braking system has a rotor shaft which extends from and rotates with a wheel on the vehicle. A rotor rotates with the shaft within a housing. The housing also contains an electromagnetic coil and two armatures. The rearward armature is in contact with the coil while the forward armature is adjacent to the rotor. The rearward armature does not touch the rotor and is more strongly attracted to the coil than the forward armature. Each armature has springs which independently urge it toward the rotor. An electrical circuit causes the current supplied to the coil to gradually decay rather than abruptly stop so that the magnetic force it generates is slowly dissipated.

When the vehicle is subjected to static braking in a parked position, the coil is de-energized so that the armatures are forced toward the rotor by their springs. In this state, the rearward armature applies force to the forward armature to increase the pressure against the rotor. When the system is disengaged, the coil is energized to attract the armatures and allow the rotor to freely rotate. Finally, the moving vehicle may be slowed or stopped with dynamic braking which de-energizes the coil. In this state, the forward armature quickly overcomes the attraction of the coil so that it engages the rotor before the rearward armature applies additional force. An increased level of braking force is applied to the rotor when the rearward armature is released. Thus, a graduated dynamic braking force is applied to the rotor when the coil is de-energized.

BRIEF DESCRIPTION OF THE DRAWINGS

FIG. 1 is a sectional side view of a braking system constructed in accordance with the invention.

FIG. 2 is a front view of the braking system in FIG. 1 without a rotor shaft attached.

FIG. 3 is a schematic drawing of a circuit for controlling the braking system of claim 1.

BEST MODE FOR CARRYING OUT THE INVENTION

Referring to FIGS. 1 and 2, a graduated, two-step electric braking system 11 with a housing 13 is shown. A front plate 15 is attached to a front side of housing 13 with a plurality of screws 17. Braking system 11 also has a plurality of screw holes 18 for attachment to a vehicle (not shown). Housing 13 and front plate 15 have central bores 23 and 25, respectively, for accommodating a splined rotor shaft 27 which extends from and rotates with a wheel (not shown) on the vehicle. Shaft 27 is rotatable relative to housing 13 and front plate 15.

A cylindrical brake rotor 31 rotates with rotor shaft 27 within a cavity 21 between housing 13 and front plate 15. Brake rotor 31 has a central hole 33 for receiving rotor shaft 27. Torque is transmitted from rotor shaft 27 to brake rotor 31 through a key or spline 29 on rotor shaft 27 which fits within a keyway/spline slot 35 in brake rotor 31. There is no axial lash or play between shaft 27 and rotor 31, but there is some axial play between rotor 31 and housing 13. Rotor 31 has slots 55 with contain movable annular friction puck or splined hub and brake pad 53 which increases the rigidity of the assembly.

Referring to FIG. 1, housing 13 contains an electromagnetic coil 41 which is concentric with shaft 27. In the preferred embodiment, coil 41 is integrally formed with housing 13. A source of electrical power (not shown) will selectively energize coil 41 through wires 19. A rearward armature 45 and a forward armature 47 are located between housing 13 and rotor 31. Armatures 45, 47 are formed from a ferrous material and are annular in shape. Armatures 45, 47 are secured to housing 13 with screws 17 to prevent rotation therebetween. Armatures 45, 47 are also concentric with shaft 27 and have the same outer diameter. Armatures 45, 47 have central bores 45a and 47a, respectively, for accommodating a hub 31a on brake rotor 31. Bore 47a on forward armature 47 is counterbored to better accommodate brake rotor hub 31a. A flange 31b of brake rotor 31 is located in cavity 21 between a forward side of forward armature 47 and a rearward side of front plate 15. Rearward armature 45 is immediately adjacent to and makes metal-to-metal contact with coil 41 so that it is sandwiched between forward armature 47 and a forward side of housing 13. Rearward armature 45 is free of contact with brake rotor 31, while forward armature 47 is separated from coil 41 by the width of rearward armature 45. Although neither armature 45, 47 contacts rotor 31, forward armature 47 makes contact with brake pad 53. Since rearward armature 45 is closer to coil 41 than forward armature 47, it is more strongly attracted to coil 41 than forward armature 47 when coil 41 is energized. It is important to select the proper thickness of armature 45 in order to achieve a sufficient magnetic flux density to cause the flux to go into armature 47. In one embodiment, rearward armature 45 has a very small step 46 on a forward side which creates an air space between armatures 45, 47 to better control their movement and responsiveness to coil 41. Alternatively, nonmagnetic shims (not shown) may be placed between armatures 45, 47 to accomplish the same purpose.

Housing 13 contains a plurality of holes 59 (only one shown) which contain a corresponding number of coil springs 49. Springs 49 apply an axial force to rearward armature 45 in a forward direction to urge it toward forward armature 47. Springs 49 do not directly engage forward armature 47. Housing 13 also contains another plurality of slots 60 (only one shown) which contain a corresponding number of coil springs 50. Springs 50 extend through holes 45b in rearward armature 45 and apply an axial force to forward armature 47 in a forward direction to urge it toward brake rotor 31. Springs 50 do not exert a force on rearward armature 45.

Screws 17 and a spacer 63 extend through armatures 45, 47 parallel to shaft 27 to rigidly secure them to housing 13. Screws 17 and spacers 63 prevent armatures 45, 47 from rotating relative to housing 13, but allow slight axial movement relative to housing 13, rotor 31 and one another.

As shown schematically in FIG. 3, brake assembly 11 utilizes an electrical circuit 61 which causes the current supplied to coil 41 to gradually decay rather than abruptly stop. In the preferred embodiment, assembly 11 is powered by a DC power source such as a battery, and circuit 61 is a diode. Thus, when coil 41 is de-energized, the amount of magnetic force it generates is somewhat slowly dissipated over a short amount of time. This controlled dissipation slightly increases the time required for springs 49, 50 to overcome the attraction of armatures 45, 47, respectively, to coil 41.

Brake pad 53 enhances the braking efficiency of brake system 11. Brake pad 53 extends through slots or openings 55 in brake rotor 31. Brake pad 53 has a forward side which contacts a rearward side of front plate 15, and a rearward side which contacts a forward side of forward armature 47.

In operation, brake assembly 11 is attached to the wheel of a vehicle (not shown) through rotor shaft 27. When the vehicle is subjected to static braking in a parked position, coil 41 is de-energized so that armatures 45, 47 are not attracted to coil 41, but are forced toward brake rotor 31 by springs 49, 50, respectively. Only forward armature 47 engages brake pad 53, but rearward armature 45 applies force to forward armature 47 to increase the pressure against brake rotor 31. This pressure squeezes brake pad 53 between forward armature 47 and front plate 15 to prevent the rotation of brake rotor 31.

Brake system 11 is in a dynamic or free running position when the vehicle is moving. In this state, coil 41 is energized so that armatures 45, 47 are attracted to coil 41 and overcome the force of springs 49, 50, respectively. This allows brake rotor 31 to freely rotate in cavity 21.

Finally, the moving vehicle may be slowed or brought to a complete stop by applying dynamic braking. Dynamic braking is accomplished by de-energizing coil 41. Since forward armature 47 is farther away from coil 41 than rearward armature 45, springs 50 are able to overcome the attraction of forward armature 47 to coil 41 more quickly than springs 49 can for rearward armature 45. This difference in sensitivity allows forward armature 47 to move axially forward, relative to rearward armature 45, to engage brake rotor 31 and apply a first, lower level of braking force while rearward armature 45 remains attracted and adjacent to coil 41. The first level of braking force decreases the speed of the vehicle, but is incapable of causing the wheels to abruptly stop or skid. The gradual decay of magnetic force generated by coil 41 causes a slightly greater delay in the release of rearward armature 45 from coil 41. When springs 49 are able to overcome the attraction of rearward armature 45 to coil 41, a second and greater level of braking force is applied to brake rotor 31. Although the second level of braking force is usually applied when the vehicle has come to a stop, it is sufficient to bring the vehicle to a quick but smooth stop. Thus, a graduated dynamic braking force is applied to brake rotor 31 when coil 41 is de-energized.

The invention has several advantages. The braking system is able to dynamically brake and stop a vehicle without skidding or Sliding the wheels on a support surface, and yet has a high static braking force for parking the vehicle on inclines and the like.

While the invention has been shown or described in only some of its forms, it should be apparent to those skilled in the art that it is not so limited, but is susceptible to various changes without departing from the scope of the invention.

We claim:

1. An electric brake assembly, comprising:

a housing;

a rotary shaft having an axis extending into the housing;

a brake rotor mounted on the rotary shaft for rotation therewith;

a first armature mounted in the housing and being free to move axially for a limited distance relative to the housing;

a second armature mounted in the housing and being free to move axially for a limited distance relative to the housing;

a first spring located between the housing and the first armature for urging the first armature toward the rotor;

a second spring located between the housing and the second armature for urging the second armature toward the rotor to frictionally engage the rotor and prevent rotation of the rotor relative to the housing;

a single electromagnetic coil mounted in the housing for urging both of the armatures away from the rotor when energized to compress the springs and allow the rotor to freely rotate;

an electronic controller which de-energizes the coil to cause a first level of braking force to be applied to the rotor by the second armature before the first spring overcomes a magnetic attraction of the coil on the first armature; wherein the controller causes an electrical current supplied to the coil to gradually decay rather than abruptly stop such that the second armature will apply the first level of braking force to the rotor before the first spring overcomes the magnetic attraction of the coil on the first armature; and wherein when the coil is energized there is an absence of braking force.

2. The brake assembly of claim 1 wherein the armatures are mounted adjacent to one another on the same side of the rotor.

3. An electric brake assembly comprising:

a housing;

a rotary shaft having an axis extending into the housing;

a brake rotor mounted on the rotary shaft for rotation therewith;

a first armature mounted in the housing and being free to move axially for a limited distance relative to the housing;

a second armature mounted in the housing and being free to move axially for a limited distance relative to the housing;

a first spring located between the housing and the first armature for urging the first armature toward the rotor;

a second spring located between the housing and the second armature for urging the second armature toward the rotor to frictionally engage the rotor and prevent rotation of the rotor relative to the housing;

a single electromagnetic coil mounted in the housing for urging both of the armatures away from the rotor when energized to compress the springs and allow the rotor to freely rotate; and wherein the second armature is located between the rotor and the first armature, and the first armature is free of contact with the rotor at all times.

4. An electric brake assembly comprising:

a housing;

a rotary shaft having an axis extending into the housing;

a brake rotor mounted on the rotary shaft for rotation therewith;

a first armature mounted in the housing and being free to move axially for a limited distance relative to the housing;

a second armature mounted in the housing and being free to move axially for a limited distance relative to the housing;

a first spring located between the housing and the first armature for urging the first armature toward the rotor;

a second spring located between the housing and the second armature for urging the second armature toward the rotor to frictionally engage the rotor and prevent rotation of the rotor relative to the housing;

a single electromagnetic coil mounted in the housing for urging both of the armatures away from the rotor when energized to compress the springs and allow the rotor to freely rotate; and wherein the first spring urges the first armature against the second armature to apply an additional braking force to the rotor when the coil is de-energized.

5. The brake assembly of claim 4, further comprising a brake pad located between the rotor and the second armature.

6. The brake assembly according to claim 5, further comprising a plate mounted to the housing and surrounding the rotor on an opposite side of the housing, the plate being contacted by the brake pad when the coil is de-energized.

7. The brake assembly according to claim 4 wherein the first and second armatures are secured to the housing with at least one screw to prevent rotation therebetween.

8. The brake assembly of claim 4, further comprising a stand-off located between the armatures for creating an air space therebetween.

9. An electric brake assembly comprising:

a housing;

a rotary shaft having an axis extending into the housing;

a brake rotor mounted on the rotary shaft for rotation therewith;

a first armature mounted in the housing and being free to move axially for a limited distance relative to the housing;

a second armature mounted in the housing and being free to move axially for a limited distance relative to the housing;

a first spring located between the housing and the first armature for urging the first armature toward the rotor;

a second spring located between the housing and the second armature for urging the second armature toward the rotor to frictionally engage the rotor and prevent rotation of the rotor relative to the housing;

a single electromagnetic coil mounted in the housing for urging both of the armatures away from the rotor when energized to compress the springs and allow the rotor to freely rotate; and wherein the first armature has a thickness which is selected to allow a magnetic flux generated by the coil to enter the second armature.

10. An electric brake assembly comprising:

a housing;

a rotary shaft having an axis extending into the housing;

a brake rotor mounted on the rotary shaft for rotation therewith;

a first armature mounted in the housing on a first side of the rotor and being free to move axially for a limited distance relative to the housing;

a second armature mounted in the housing on the first side of the rotor and being free to move axially for a limited distance relative to the housing;

a first spring located between the housing and the first armature for urging the first armature toward the rotor;

a second spring located between the housing and the second armature for urging the second armature toward the rotor to frictionally engage the rotor and prevent rotation of the rotor relative to the housing;

a single electromagnetic coil mounted in the housing for urging both of the armatures away from the rotor when energized to compress the springs and allow the rotor to freely rotate;

a controller for causing an electrical current supplied to the coil to gradually decay rather than abruptly stop such that the second armature will apply a first level of braking force to the rotor before the first spring overcomes a magnetic attraction of the coil on the first armature; and wherein when the coil is energized there is an absence of braking force.

11. An electric brake assembly comprising:

a housing;

a rotary shaft having an axis extending into the housing;

a brake rotor mounted on the rotary shaft for rotation therewith;

a first armature mounted in the housing on a first side of the rotor and being free to move axially for a limited distance relative to the housing;

a second armature mounted in the housing on the first side of the rotor and being free to move axially for a limited distance relative to the housing;

a first spring located between the housing and the first armature for urging the first armature toward the rotor;

a second spring located between the housing and the second armature for urging the second armature toward the rotor to frictionally engage the rotor and prevent rotation of the rotor relative to the housing;

a single electromagnetic coil mounted in the housing for urging both of the armatures away from the rotor when energized to compress the springs and allow the rotor to freely rotate; wherein the second armature is located between the rotor and the first armature, and wherein the first armature applies a force to the second armature when the coil is de-energized and is free of contact with the rotor at all times.

12. The brake assembly of claim 11, further comprising a brake pad located between the rotor and the second armature.

13. The brake assembly according to claim 12, further comprising a plate mounted to the housing and surrounding the rotor on an opposite side of the housing from the armatures, the plate being contacted by the brake pad when the coil is de-energized.

14. The brake assembly according to claim 11 wherein the first and second armatures are secured to the housing with at least one screw to prevent rotation therebetween.

15. The brake assembly of claim 11, further comprising a stand-off located between the armatures for creating an air space therebetween.

16. An electric brake assembly, comprising:
a housing;
a rotary shaft having an axis extending into the housing;
a brake rotor mounted on the rotary shaft for rotation therewith;
a first armature mounted in the housing on a first side of the rotor and being free to move axially for a limited distance relative to the housing;
a second armature mounted in the housing on the first side of the rotor and being free to move axially for a limited distance relative to the housing;
a first spring located between the housing and the first armature for urging the first armature toward the rotor;
a second spring located between the housing and the second armature for during the second armature toward the rotor to frictionally engage the rotor and prevent rotation of the rotor relative to the housing;
a single electromagnetic coil mounted in the housing for urging both of the armatures away from the rotor when energized to compress the springs and allow the rotor to freely rotate; and wherein
the first armature has a thickness which is selected to allow a magnetic flux generated by the coil to enter the second armature.

17. An electric brake assembly, comprising:
a housing;
a rotary shaft having an axis extending into the housing;
a brake rotor mounted on the rotary shaft for rotation therewith;
a first armature mounted in the housing and free of contact with the rotor at all times, the first armature also being free to move axially for a limited distance relative to the housing;
a second armature mounted in the housing between the rotor and the first armature and being free to move axially for a limited distance relative to the housing;
a brake pad located between the rotor and the second armature;
a first spring located between the housing and the first armature for urging the first armature toward the second armature to apply force against the second armature;
a second spring located between the housing and the second armature for urging the second armature toward the rotor to frictionally engage the rotor and prevent rotation of the rotor relative to the housing;
a single electromagnetic coil mounted in the housing for urging both of the armatures away from the rotor when energized to compress the springs and allow the rotor to freely rotate; and
a controller for causing an electrical current supplied to the coil to gradually decay when it is de-energized rather than abruptly stop, such that the second armature will apply a first level of braking force to the rotor before the first spring overcomes a magnetic attraction of the coil on the first armature; and wherein
when the coil is energized there is an absence of braking force.

18. The brake assembly according to claim 17, further comprising a plate mounted to the housing and surrounding the rotor on an opposite side of the housing from the armatures, the plate being contacted by the brake pad when the coil is de-energized.

19. The brake assembly according to claim 18 wherein the first and second armatures are secured to the housing with a plurality of screws to prevent rotation therebetween.

20. The brake assembly of claim 18, further comprising a step located between the armatures for minimizing contact area therebetween.

21. The brake assembly of claim 18 wherein the first armature has a thickness which is selected to allow a magnetic flux generated by the coil to enter the second armature.

22. A method for braking a rotary shaft, comprising:
(a) mounting a brake rotor to the shaft the rotor having a housing with first and second armatures which are urged toward the rotor and a single electromagnetic coil;
(b) energizing the coil to magnetically attract the armatures to urge both of the armatures away from the rotor and allow the rotor to freely rotate; then
(c) releasing the second armature to overcome a magnetic attraction of the coil before the first armature overcomes the magnetic attraction of the coil; and wherein
step (c) comprises gradually decaying an electrical current supplied to the coil such that the second armature will apply the first level of braking force to the rotor before the first armature overcomes the magnetic attraction of the coil.

23. The method of claim 22, further comprising the step of applying additional braking force to the rotor by urging the first armature against the second armature.

24. The method of claim 22, further comprising the step of maintaining an air gap between the first and second armatures.

25. A method for braking a rotary shaft, comprising:
(a) mounting a brake rotor to the shaft, the rotor having a housing with first and second armatures which are urged toward the rotor and a single electromagnetic coil;
(b) energizing the coil to magnetically attract the armatures to urge both of the armatures away from the rotor and allow the rotor to freely rotate; then
(c) releasing the second armature to overcome a magnetic attraction of the coil before the first armature overcomes the magnetic attraction of the coil; and wherein
step (c) comprises passing a magnetic flux through the first armature to attract the second armature toward the coil.

* * * * *